(12) United States Patent
Sakai et al.

(10) Patent No.: US 7,527,332 B2
(45) Date of Patent: May 5, 2009

(54) SEAT APPARATUS

(75) Inventors: Makoto Sakai, Anjo (JP); Yukifumi Yamada, Toyota (JP); Sadao Ito, Anjo (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 455 days.

(21) Appl. No.: 11/225,027

(22) Filed: Sep. 14, 2005

(65) Prior Publication Data

US 2006/0061176 A1    Mar. 23, 2006

(30) Foreign Application Priority Data

Sep. 21, 2004 (JP) ............................. 2004-273300

(51) Int. Cl.
*B60N 2/42* (2006.01)
(52) U.S. Cl. .................................... 297/216.1; 297/470
(58) Field of Classification Search ............. 297/216.1, 297/468, 469, 470, 216.13, 216.14, 216.15, 297/216.16, 378.1, 378.13, 344.12, 344.15
See application file for complete search history.

(56) References Cited

U.S. PATENT DOCUMENTS 4,248,480 A * 2/1981 Koucky et al. ............... 297/473
4,257,626 A * 3/1981 Adomeit ...................... 280/806
4,487,454 A * 12/1984 Biller .......................... 297/468
4,790,597 A * 12/1988 Bauer et al. .................. 297/468
5,226,697 A * 7/1993 Borlinghaus et al. ... 297/216.18
6,116,689 A * 9/2000 Bauer et al. .............. 297/344.15
6,467,849 B1 * 10/2002 Deptolla ...................... 297/464
6,505,888 B1 * 1/2003 Teufel et al. ........... 297/344.15
7,036,878 B2 * 5/2006 Masutani .................. 297/216.1

FOREIGN PATENT DOCUMENTS

FR    2 796 602    1/2001

* cited by examiner

*Primary Examiner*—Joseph F Edell
(74) *Attorney, Agent, or Firm*—Finnegan, Henderson, Farabow, Garrett & Dunner, LLP

(57) ABSTRACT

A vehicle seat apparatus includes a first link vertically movably supporting a seat to a seat rail of a floor side, a second link connecting a seat belt anchor to the seat side for restraining an occupant into the seat and a third link provided between the first link and the second link for connecting the first link and the second link, the third link being engagable with a lock member which is fixedly connected to the seat side. The third link is normally disengaged from the lock member to allow the seat to move in a vertical direction and is engaged with the lock member in an emergency upon receipt of an active force through the seat belt anchor and the second link to control a vertical movement of the seat.

8 Claims, 5 Drawing Sheets

FIG. 4A
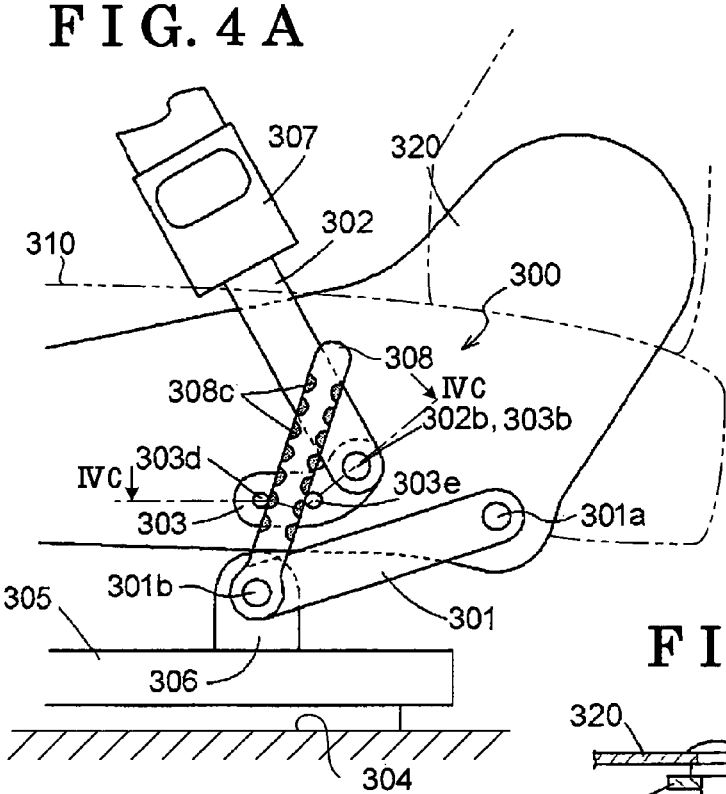
FIG. 4C
FIG. 4B
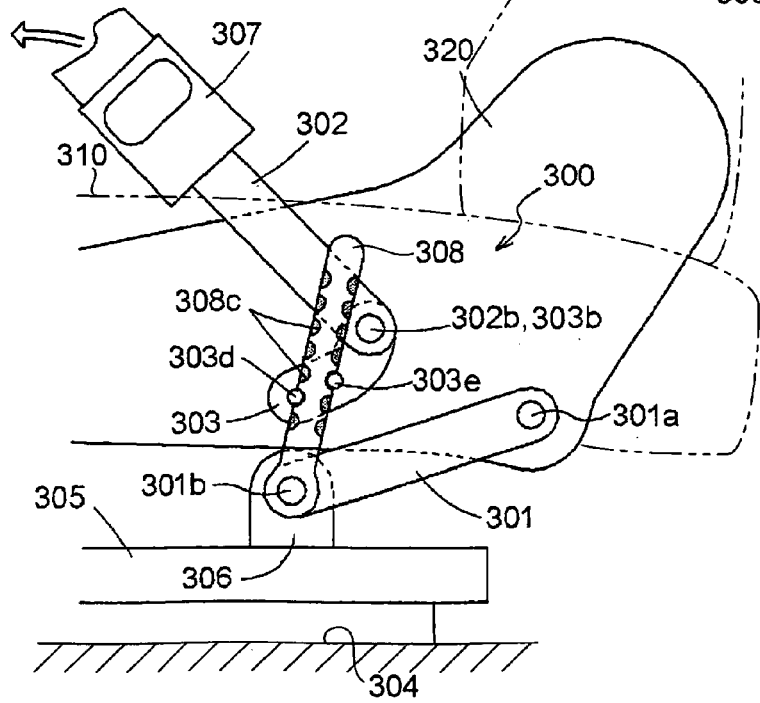

SEAT APPARATUS

This application is based on and claims priority under 35 U.S.C. § 119 to Japanese Patent Application 2004-273300, filed on Sep. 21, 2004, the entire content of which is incorporated herein by reference.

FIELD OF THE INVENTION

This invention relates to a seat apparatus which is movable upward and downward, more particularly to a seat apparatus which controls upward and downward movement of a seat in an emergency.

BACKGROUND

Conventionally, a seat apparatus is known which includes a height adjusting mechanism. An occupant who sits on a seat provided with the aforementioned seat apparatus can set a seat height in response to one's physical size. Further, the seat apparatus is provided with a lock mechanism for controlling a seat operation for preventing upward and downward movement of the seat in case of a vehicle crash.

One of the known seat apparatus of this type is described in FR2796602A which includes a so-called vertical lock mechanism having a tension member, a cam, a lock member, and a link provided with a gear on its side portion. The tension member is connected to a seat belt anchor serving as a seat belt base, the cam is pivotally supported so as to be movable in response to the tension member, the lock member can change a condition of unlock and lock by activation of the cam, and the link is engagable with the lock member and connects a seat to a floor.

However, the seat apparatus described in FR2796602A is necessary to go through the following process for operating the lock mechanism. First, a tensile force of the seat belt anchor is transmitted to the tension member, then the tension member rotates the cam, and then an engaging member engages with a gear provided on side portion of the link by rotation of the cam. Because a lock condition is achieved through operations of large numbers of members, a play of a part at which each member is engaged tends to become larger, and the seat operation in an emergency may be delayed to be locked or uncertainly be locked. Moreover, when the seat apparatus includes large numbers of operating members, an incidence of failure is increased and manufacturing cost of the seat apparatus being expensive.

A need thus exists for a seat apparatus which is configured to improve reliability of the seat operation lock in an emergency, to reduce the incidence of failure, and to manufacture the seat apparatus at a low cost.

SUMMARY OF THE INVENTION

According to an aspect of the present invention, a vehicle seat apparatus includes a first link vertically movably supporting a seat to a seat rail of a floor side, a second link connecting a seat belt anchor to the seat side for restraining an occupant into the seat and a third link provided between the first link and the second link for connecting the first link and the second link, the third link being engagable with a lock member which is fixedly connected to the seat side. The third link is normally disengaged from the lock member to allow the seat to move in a vertical direction and is engaged with the lock member in an emergency upon receipt of an active force through the seat belt anchor and the second link to control a vertical movement of the seat.

According to a further aspect of the present invention, a vehicle seat apparatus includes a first link vertically movably supporting a seat to a seat rail of a floor side, a second link connecting a seat belt anchor to the seat side for restraining an occupant into the seat, a third link connected to the second link and operated in accordance with the movement of the seat belt anchor when the seat belt anchor is pulled forward of a vehicle in an emergency, and a lock member provided on the seat rail side and having at least an engaging recess portion filled up with a resin. The third link controls the vertical movement of the seat by breaking the resin of the lock member and engaging with the engaging recess portion of the lock member when the third link is operated in the emergency and the third link is slidably operated along the resin of the lock member in accordance with the vertical movement of the seat in normal operation.

BRIEF DESCRIPTION OF THE DRAWINGS

The foregoing and additional features and characteristics of the present invention will become more apparent from the following detailed description considered with reference to the accompanying drawings, wherein:

FIG. 4A is a schematic view illustrating an unlock condition of the seat apparatus according to a third embodiment of the present invention.

FIG. 4B is a schematic view illustrating a lock condition of the seat apparatus according to the third embodiment of the present invention.

FIG. 4C is a cross-sectional view of a substantial part of the seat apparatus according to the third embodiment of the present invention.

DETAILED DESCRIPTION

Figure 1:
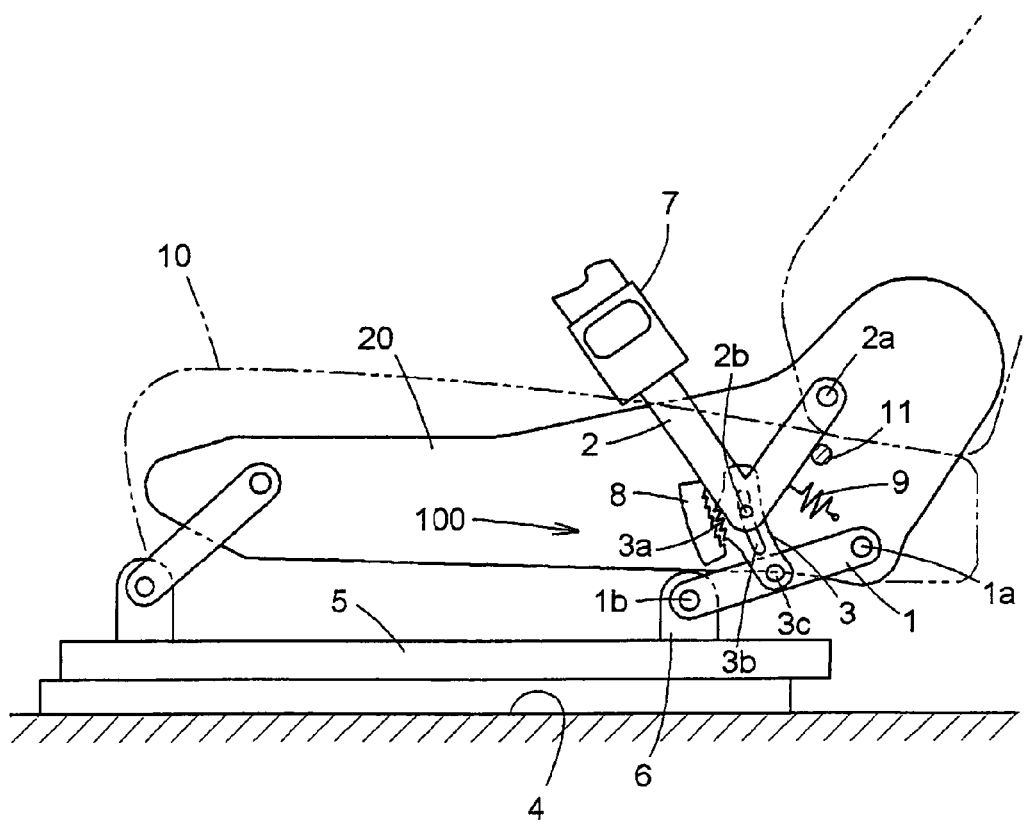
FIG. 1 is a schematic view of a seat apparatus according to a first embodiment of the present invention.

Embodiments of the present invention will be explained with reference to illustrations of drawing figures as follows.

A first embodiment of the present invention is shown in FIGS. 1 and 2A-2C. A seat apparatus 100 according to the first embodiment of the present invention includes a first link 1 and a second link 2.

The first link 1 supports a seat frame 20 of a seat 10 to a seat rail 5 provided on a floor 4. The first link 1 can be assembled, for example, to a bracket 6 provided on the seat rail 5. The first link 1 is pivotally connected to the seat frame 20 at a connecting portion 1a and pivotally connected to the bracket 6 of the seat rail 5 at a connecting portion 1b. Because the first link 1 is pivotally movable at the connecting portions 1a and 1b, the seat 10 can be operated upward and downward relative to the floor 4 by changing an angle of the first link 1 relative to the floor 4.

The second link 2 connects a seat belt anchor 7 for restraining an occupant into the seat 10 to the seat frame 20 of the seat 10. More particularly, a first end of the second link 2 is connected to the seat belt anchor 7 by, for example, bonding, welding, and bolting, or the like and a second end of the second link 2 is connected to the seat frame 20 at a connecting portion 2a.

A third link 3 for connecting the first link 1 and the second link 2 is provided therebetween. A gear portion 3a, which is engagable with a lock member 8 provided on a seat frame 20, is formed on the side portion of the third link 3. A condition of lock and unlock of the seat apparatus 100 caused by a disengagement and an engagement between the gear portion 3a of the third link 3 and the lock member 8 is achieved by an operation of the second link 2.

For example, the third link 3 is provided with a guiding groove 3b for allowing the operation of the second link 2 and a second connecting portion 2b of the second link 2 is rotatably and slidably supported in the guiding groove 3b. Further, a lower end portion of the third link 3 is connected to the first link 1 at a connecting portion 3c positioned between the connecting portions 1a and 1b of the first link.

Figure 2A:
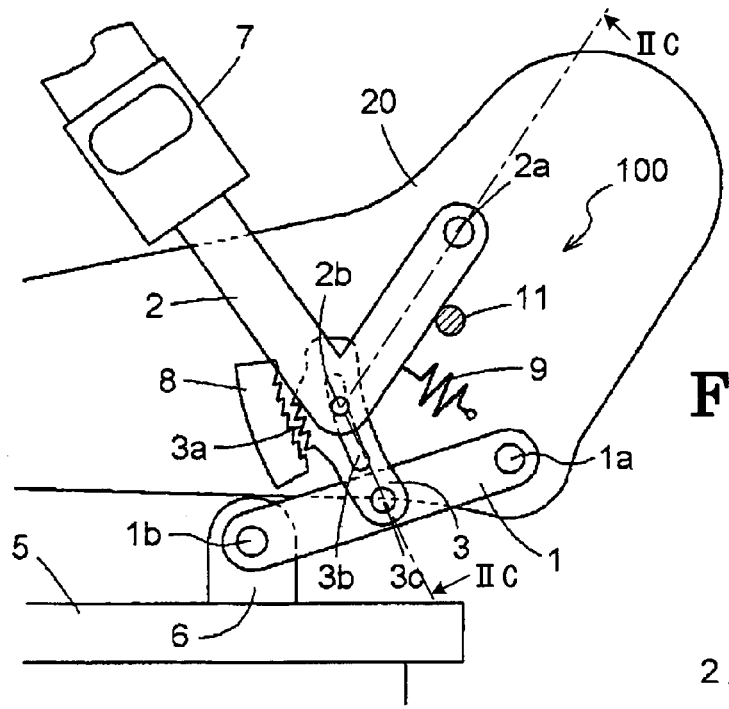
FIG. 2A is a schematic view illustrating an unlock condition of the seat apparatus according to the first embodiment of the present invention.
Figure 2C:
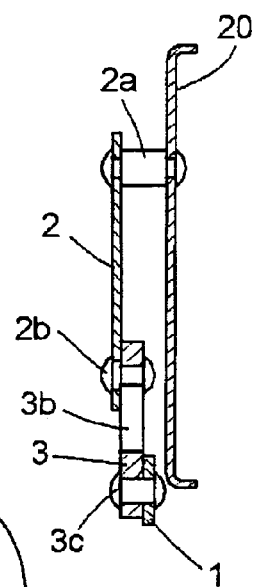
FIG. 2C is a cross-sectional view of a substantial part of the seat apparatus according to the first embodiment of the present invention.

According to the aforementioned seat apparatus, the second link 2 disengages the gear portion 3a of the third link 3 away from the lock member 8 because the second link 2 is biased in a direction where the third link 3 being disengaged from the lock member 8 by a spring 9 (i.e., a biasing means) provided on the seat frame 20 and the unlock condition is thereby kept in normal operation as shown in FIG. 2A. An appropriate distance between the gear portion 3a of the third link 3 and the lock member 8 can be kept because of the second link 2 being latched at an appropriate position by a latching member 11.

Figure 2B:
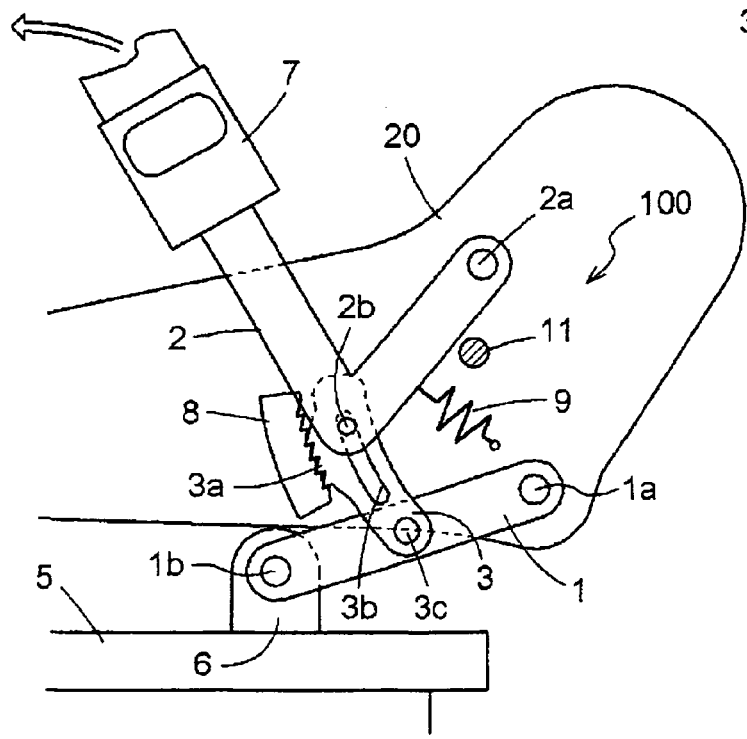
FIG. 2B is a schematic view illustrating a lock condition of the seat apparatus according to the first embodiment of the present invention.

On the other hand, the seat belt anchor 7 is pulled in a direction of an arrow shown in FIG. 2B by a forward movement of the occupant in an emergency such as a sudden stop of a vehicle. In such a condition, the second link 2 is operated upward along with the guiding groove 3b of the third link 3 against a biasing force of the spring 9. The second connecting portion 2b of the second link 2 pushes a front wall portion of the guiding groove 3b of the third link 3 and the third link 3 is biased against the lock member 8. Then the gear portion 3a of the third link 3 engages with the lock member 8 and the lock condition is thereby achieved as shown in FIG. 2B. In consequence, the first link 1 cannot be operated and upward and downward movement of the seat 10 is prevented.

With the configuration of the seat apparatus 100 according to the first embodiment of the present invention, lock of a seat operation, caused by a movement of the seat belt anchor 7 by the forward movement of the occupant in the emergency such as the sudden stop of the vehicle, is achieved by operations of the first link 1, the second link 2, and the third link 3. The seat apparatus according to the present invention can reduce the number of operating members in comparison with the conventional seat apparatus which performs the lock of the seat operation by operations of a tension member, a cam, a lock member, and a link provided with a gear on its side portion.

Thus, an assembling error and a measurement error occurred during a manufacturing procedure of the seat apparatus 100 are reduced and a play of a part at which each member is engaged is thereby reduced. In consequence, the seat operation can be securely locked in the emergency. Because the number of operating members can be reduced, the structure of the seat apparatus 100 can be simplified, an incident of failure can be reduced, and the seat apparatus 100 can easily be maintained. Further, such simplified seat apparatus 100 can be manufactured at a low cost.

Because the second link 2 and the third link 3 are configured so as to be rotatable and slidable each other, the third link 3 can smoothly be operated according to a seat height adjusting operation without engaging with the lock member 8 in an occasion where the occupant adjusts the seat height. On the other hand, when the seat belt anchor 7 pulls the second link 2 by the forward movement of the occupant in the emergency such as the sudden stop of the vehicle, the third link 3 is biased forward by the second link 2 and engaged with the lock member 8, thereby the upward and downward movement of the seat can be securely controlled. With the configuration of the seat apparatus 100 including the third link 3 provided with the guiding groove 3b, the timing of the disengagement and the engagement between the third link 3 and the lock member 8 can be adjusted by changing a shape or a measurement of the guiding groove 3. Thus, an optimal lock mechanism can be built in response to, for example, characteristic of the vehicle to which the seat apparatus 100 is assembled.

A construction of the second link 2 and the third link 3 being rotatable and slidable each other is explained in the first embodiment by taking an example of a structure which uses the guiding groove 3b provided on the third link 3. However, the seat apparatus may be provided with a slidable slider, to which the second link 2 is connected by a pin, on the outer surface of the third link 3 for enabling the aforementioned structure of the second link 2 and the third link 3.

Figure 3A:
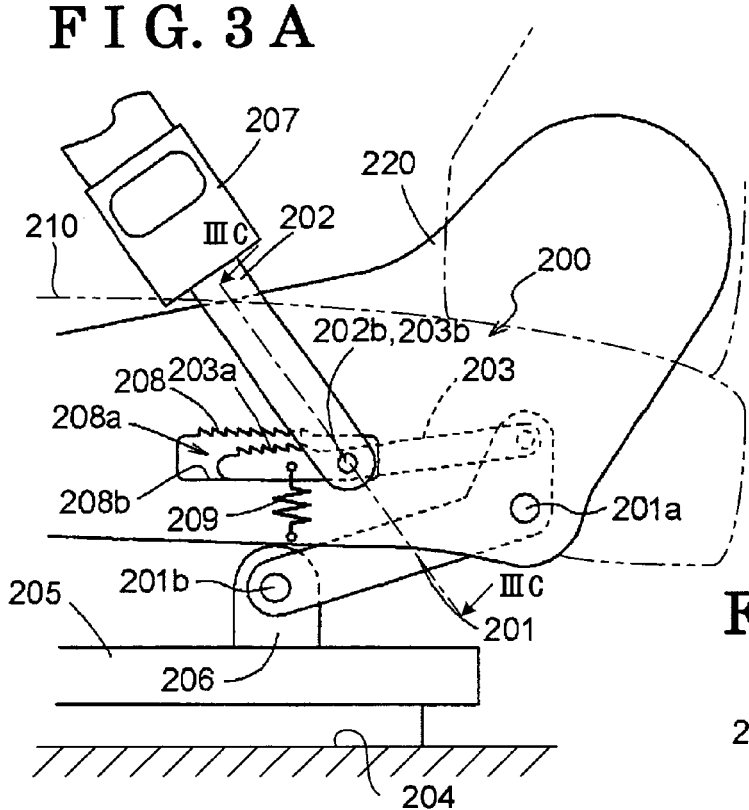
FIG. 3A is a schematic view illustrating an unlock condition of the seat apparatus according to a second embodiment of the present invention.
Figure 3C:
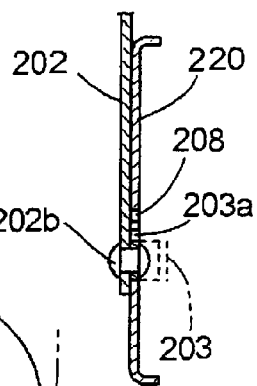
FIG. 3C is a cross-sectional view of a substantial part of the seat apparatus according to the second embodiment of the present invention.
Figure 3B:
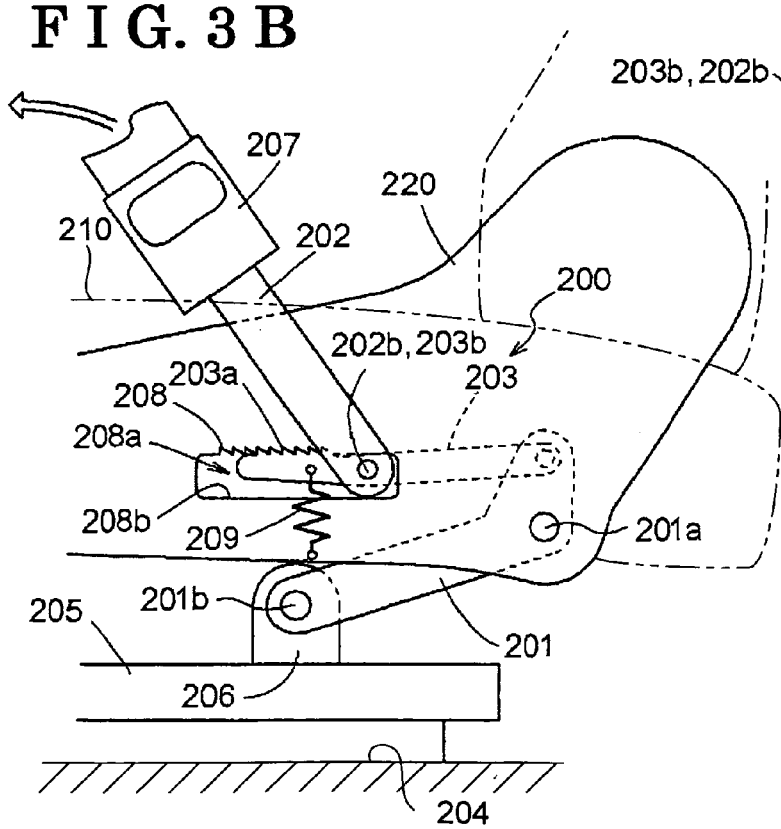
FIG. 3B is a schematic view illustrating a lock condition of the seat apparatus according to the second embodiment of the present invention.

A second embodiment of the present invention is shown in FIGS. 3A-3C. A seat apparatus 200 according to the second embodiment of the present invention includes a first link 201 and a second link 202 as well as the seat apparatus 100 according to the first embodiment of the present invention. Hereinafter, the same structure as described in the aforementioned embodiment is not repeatedly explained.

A structure of the first link 201 and the second link 202 of the seat apparatus 200 is basically in common with that of the seat apparatus 100, however, the second link 202 is connected to a seat frame 220 by providing a connecting portion 202b of the second link 202 in a support space 208a formed with a lock member 208 provided on the seat frame 220.

A third link 203 for connecting the first link 201 and the second link 202 is provided therebetween. A gear portion 203a, which is engagable with a lock member 208, is formed on the side portion of the third link 203. A condition of unlock and lock of the seat apparatus 200 cause by a disengagement and an engagement between the gear portion 203a of the third link 203 and the lock member 208 is achieved by an operation of the second link 202.

More particularly, a connecting portion 202b of the second link 202 is pivotally supported at a point of action 203b of the third link 203.

According to the aforementioned seat apparatus, the gear portion 203a of the third link 203 is disengaged from the lock member 8 because the third link 203 is biased in a direction where the third link 203 being disengaged from the lock member 208 by a spring 209 provided on the seat 210 side and the unlock condition is thereby kept in normal operation as shown in FIG. 3A. An appropriate distance between the gear portion 203a of the third link 203 and the lock member 208 can be kept because the third link 203 is fixed at an appropriate position by a contacting face 208b of the support space 208a.

On the other hand, the seat belt anchor 207 is pulled in a direction of an arrow shown in FIG. 3B by a forward movement of an occupant in an emergency such as a sudden stop of a vehicle. In such a condition, the second link 202 operates the point of action 203b of the third link 203 upward against a biasing force of the spring 209 and the gear portion 203a of the third link 203 is engaged with the lock member 208. Thus the lock condition is achieved as shown in FIG. 3B. In consequence, the first link 201 cannot be operated and upward and downward movement of the seat 210 is prevented.

With the configuration of the seat apparatus 200 according to the second embodiment of the present invention, lock of a seat operation in the emergency is achieved by operations of the first link 201, the second link 202, and the third link 203. The seat apparatus according to the present invention can reduce the number of operating members in comparison with the conventional seat apparatus which performs the lock of the seat operation by operations of a tension member, a cam, a lock member, and a link provided with a gear on its side portion. Thus, an assembling error and a measurement error occurred during a manufacturing procedure of the seat apparatus 200 are reduced and a play of a part at which each member is engaged is thereby reduced. In consequence, the seat operation can be securely locked in the emergency. Because the number of operating members can be reduced, the structure of the seat apparatus 200 can be simplified, an incident of failure can be reduced, and the seat apparatus 200 can easily be maintained. Further, such simplified seat apparatus 200 can be manufactured at a low cost.

Because the second link 202 is pivotally supported by the third link 203, an oscillation between the second link 202 and the third link 203 is not occurred. Thus, the operation of the second link 202 is immediately transmitted to the third link 203 when the seat belt anchor 207 is pulled in the emergency and an immediate lock of the seat operation in the emergency is thereby performed. If the position of the point of action 203b, which is provided on the third link 3 that pivotally supports the second link 202, is suitably changed, the timing of the disengagement and the engagement between the third link 203 and the lock member 208 can be adjusted. Thus, the seat apparatus 200 including an optimal lock mechanism can be built in response to, for example, characteristic of the vehicle to which the seat apparatus 200 is assembled.

A third embodiment of the present invention in shown in FIGS. 4A-4C. A seat apparatus 300 according to the third embodiment of the present invention includes a first link 301 and a second link 302. The first link 301 movably supports a seat 310 upward and downward to a seat rail 305 of a floor 304 and the second link 302 connects the seat belt anchor 7 for restraining an occupant into the seat 310 to the seat frame 320 of the seat 310. A third link 303, which is engagable with a lock member 308 fixedly connected to a seat rail 305, is connected to the second link 302. Engaging recess portions 308c, which are normally filled up with resin, are formed on the both sides of the lock member 308. The lock member 308 is positioned between engaging pins 303d and 303e which are provided on the third link 303. A first engaging pin 303d is engagable with one of the engaging recess portions 308c arranged on a first side of the lock member and a second engaging pin 303e is engagable with one of the engaging recess portions 308c arranged on a second side of the lock member. Normally, the third link 303 slides over the engaging recess portions 308c which are filled up with the resin and allows upward and downward movement of the seat 310. In an emergency, the third link 303 receives an active force through the seat belt anchor 307 and the second link 302 and then the engaging pins 303d and 303e break the resin which fills up the engaging recess portions 308c and thereby the engaging pins 303d and 303e engage with the engaging recess portion 308c of the lock member 308. Accordingly, the third link 303 engages with the lock member 308 and the upward and downward movement of the seat 310 is thereby controlled.

The aforementioned resin would be a material which is easily breakable by a shock from the engaging pins 303d and 303e. For example, a polypropylene resin (i.e., PP), a glass fiber resin or the like can be used. Furthermore, a thermosetting resin such as a thermosetting acrylic resin, a phenol resin, an epoxy resin, a melamine resin or the like or a thermoplastic resin such as a polyamide, a polyacetal, a polycarbonate, a polyethylene terephthalate, a polyvinylchloride, a polystyrene, a thermoplastic acrylic resin or the like can be used as the aforementioned resin.

The first link 301 of the seat apparatus 300 according to the third embodiment has a same structure as that of the seat apparatus 100 according to the first embodiment. The second link 302 connects the seat belt anchor 307 to a seat frame 320. More particularly, a first end of the second link 302 is connected to the seat belt anchor 307 by bonding, welding, and bolting, or the like, and a second end of the second link 302 is connected to an end portion of the third link 303 of the seat frame 320 at a connecting portion 302b.

An elongated lock member 308 is assembled to a connecting portion 301b of the first link 301 and plural engaging recess portions 308c are formed on the both sides of the lock member 308. The connecting portion 302b of the second link 302 is pivotally supported to the point of action 303b to which a tension force from the seat belt anchor 307 is applied. The third link 303 is provided with two engaging pins 303d and 303e which are engagable with the engaging recess portions 308c of the lock member 308. The engaging pin 303d is serving as a connecting portion for connecting the seat frame 320 with the third link 303. As shown in FIG. 4A, the engaging recess portions 8c are normally filled up with the resin so as to prevent from engaging with the engaging pins 303d and 303e.

A condition of unlock and lock of the seat apparatus 300 caused by a disengagement and an engagement between the engaging pins 303d and 303e of the third link 3 and the lock member 8 is achieved by an operation of the second link 302.

More particularly, the third link 303 can slidably operate the engaging pins 303d and 303e relative to the surface of the lock member 308 because the engaging recess portions 308c are normally filled up with the resin. Thus, an unlock condition under which the seat 310 can be movable upward and downward is kept by changing the angle of the first link 301 relative to the floor 304 as shown in FIG. 4A.

On the other hand, the seat belt anchor 307 pulls the second link 302 in a direction of an arrow shown in FIG. 4B by a forward movement of an occupant in an emergency such as a sudden stop of a vehicle. In such a condition, the second link 302 rapidly operates the point of action 303b of the third link 303 upward and the engaging pins 303d and 303e of the third link 303 are engaged with the engaging recess portion 308c by breaking the resin which fills up the engaging recess portions 308c of the lock member 308, thereby the lock condition is achieved as shown in FIG. 4B. In consequence, the first link 301 cannot be operated and the upward and downward movement of the seat 310 is prevented.

The seat apparatus 300 according to the third embodiment can bring same effects as the seat apparatus 100 according to the first embodiment and the seat apparatus 200 according to the second embodiment. Additionally, because the engaging pins 303d and 303e of the seat apparatus 300 are engagable with the engaging recess portion 308c from the both sides of the lock member 308, the lock condition is not mistakenly cancelled after the lock condition of the seat operation is achieved when the vehicle receives a shock.

Figure 5A:
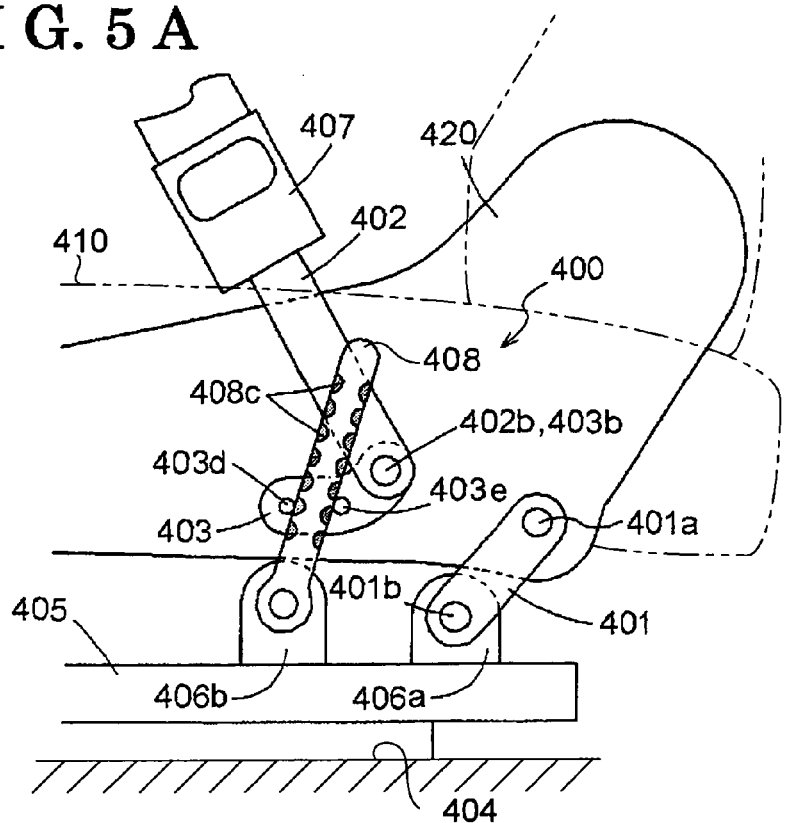
FIG. 5A is a schematic view illustrating an unlock condition of the seat apparatus according to a fourth embodiment of the present invention.
Figure 5B:
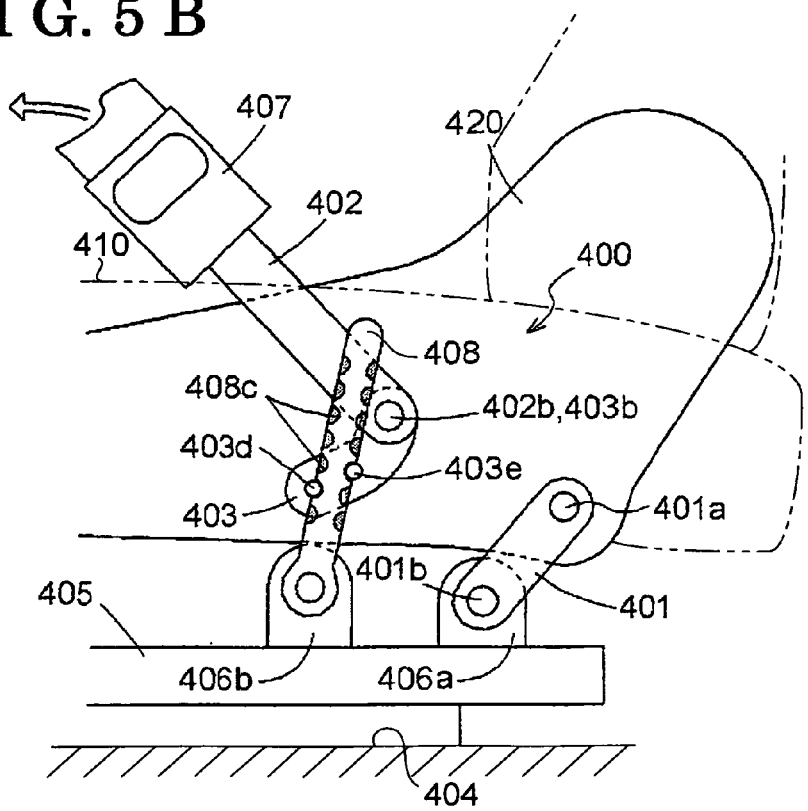
FIG. 5B is a schematic view illustrating a lock condition of the seat apparatus according to the fourth embodiment of the present invention.

A fourth embodiment of the present invention is shown in FIGS. 5A-5B. With the configuration of a seat apparatus 400 according to the forth embodiment, a lock member 408 is fixedly connected to a seat rail 405 at a different position from a first link 401.

The seat apparatus 400 is an optional example of the seat apparatus 300 according to the third embodiment. More particularly, the different point between the seat apparatus 400 and the seat apparatus 300 is an assembling position of the lock member 408. The seat apparatus 400 includes a first bracket 406a and a second bracket 406b and the lock member 408 of the seat apparatus 400 is assembled to the second bracket 406b of the seat rail 405 while the lock member 308 of the seat apparatus 300 is assembled to a single bracket 306 of the seat rail 305.

With the configuration of the seat apparatus 400, the second bracket 406b can be positioned so as to perform an optimal engagement between engaging pins 403d and 403e of a third link 403 and engaging recess portion 408c of the lock member 408. In consequence, the lock of the seat operation can be immediately and appropriately operated in an emergency such as a vehicle crash.

The seat apparatus according to the present invention can be applied to various transportation facilities such as an automobile, a train, an aircraft, a ship/boat or the like. Further, the seat apparatus can also be applied to a ride of a play facility.

With the construction of the seat apparatus according to the present invention, the lock of the seat operation caused by the movement of the seat belt anchor by the forward movement of the occupant in the emergency such as the sudden stop of the vehicle is achieved by operations of the first link, the second link, and the third link. The seat apparatus according to the present invention can reduce the number of operating members in comparison with the conventional seat apparatus which performs the lock of the seat operation by operations of the tension member, the cam, the lock member, and the link provided with the gear on its side portion. Thus, the assembling error and the measurement error occurred during the manufacturing procedure of the seat apparatus can be reduced and a play of a part at which each member is engaged is thereby reduced. In consequence, the seat operation can be securely locked in the emergency. Because the number of operating members can be reduced, the structure of the seat apparatus can be simplified, the incident of failure can be reduced, and the seat apparatus can easily be maintained. Further, such simplified seat apparatus can be manufactured at a low cost.

With the configuration of the seat apparatus of the present invention, the second link and the third link can be configured so as to be rotatable and slidable each other.

With the configuration of the seat apparatus of the present invention, the second link and the third link can be configured so as to be rotatable and slidable each other by, for example, making the second link being movable along with the guiding groove provided on the third link. Thus, the third link can smoothly be operated according to the seat height adjusting operation without engaging with the lock member in an occasion where the occupant adjusts the seat height. On the other hand, when the seat belt anchor pulls the second link by the forward movement of the occupant in the emergency such as the sudden stop of the vehicle, the third link is biased forward by the second link and engaged with the lock member, thereby the upward and downward movement of the seat can be securely controlled.

With the configuration of the seat apparatus of the present invention, the second link can be pivotally supported by the third link.

With the configuration of the seat apparatus of the present invention, the oscillation between the second link and the third link is not occurred because the second link is pivotally supported by the third link. Thus, the operation of the second link is immediately transmitted to the third link when the seat belt anchor is pulled by the forward movement of the occupant in the emergency such as the sudden stop of the vehicle and the immediate lock of the seat operation in the emergency can be thereby performed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A vehicle seat apparatus comprising:
a first link vertically movably supporting a seat to a seat rail of a floor side;
a second link connecting a seat belt anchor to a seat side for restraining an occupant into the seat; and
a third link provided between the first link and the second link for connecting the first link and the second link, wherein the third link is provided with a guiding groove to slidably connect the third link to the second link, the third link being engagable with a lock member which is fixedly connected to the seat, wherein the third link is normally disengaged from the lock member to allow the seat to move in a vertical direction and is engaged with the lock member in an emergency upon receipt of an active force through the seat belt anchor and the second link to control a vertical movement of the seat.

2. The vehicle seat apparatus according to claim 1, wherein the second link and the third link are configured to be rotatable and slidable relative to each other.

3. The vehicle seat apparatus according to claim 2, further comprising a biasing device provided between the second link and the seat configured to apply a bias to the second link in a rearward direction with respect to the vehicle, wherein the third link is normally disengaged from the lock member by the bias of the biasing device and is urged and engaged with the lock member by an active force of the second link which is moved in a forward direction with respect to the vehicle against the bias of the biasing device when the seat belt anchor is pulled in the forward direction in the emergency.

4. The vehicle seat apparatus according to claim 1, wherein the second link is pivotally supported by the third link.

5. The vehicle seat apparatus according to claim 4, further comprising a biasing device provided between the second link and the seat configured to apply a bias to the second link in a rearward direction with respect to the vehicle, wherein the third link is normally disengaged from the lock member by the bias of the biasing device and is urged and engaged with the lock member by an active force of the second link which is moved in a forward direction with respect to the vehicle against the bias of the biasing device when the seat belt anchor is pulled in a forward direction in the emergency.

6. The vehicle seat apparatus according to claim 1, further comprising a biasing device provided between the second link and the seat configured to apply a bias to the second link in a rearward direction with respect to the vehicle, wherein the third link is normally disengaged from the lock member by the bias of the biasing device and is urged and engaged with the lock member by an active force of the second link which is moved in a forward direction with respect to the vehicle against the bias of the biasing device when the seat belt anchor is pulled in the forward direction in the emergency.

7. The vehicle seat apparatus according to claim 1, wherein the second link has a connecting portion which is rotatably and slidably supported in the guiding groove.

8. The vehicle seat apparatus according to claim 7, wherein the connecting portion is a pin.

* * * * *